United States Patent

Mezzedimi

Patent Number: 5,188,196
Date of Patent: Feb. 23, 1993

[54] SYSTEM FOR RECOVERING THE LUBRICATING OIL FOR THE BEARINGS OF A CENTRIFUGAL COMPRESSOR WITH LABYRINTH SEALS

[75] Inventor: Vasco Mezzedimi, Poggibonsi, Italy

[73] Assignee: Nuovopignone-Industrie Meccaniche e Fonderia SpA, Florence, Italy

[21] Appl. No.: 823,868

[22] Filed: Jan. 22, 1992

[30] Foreign Application Priority Data

Jan. 29, 1991 [IT] Italy ............ MI 91 A-000210

[51] Int. Cl.⁵ ............................................. F01M 1/00
[52] U.S. Cl. ..................................... 184/6.16; 184/6.23; 55/203
[58] Field of Search ............ 415/110, 111, 112, 175, 415/104, 107; 210/417; 184/6.11, 6.16, 6.23; 55/203; 417/423.13

[56] References Cited

U.S. PATENT DOCUMENTS

| | | | |
|---|---|---|---|
| 1,575,970 | 3/1926 | Carrier | 29/6 |
| 1,709,896 | 4/1929 | Carrier | 29/6 |
| 1,879,627 | 9/1932 | Mendenhall et al. | 384/132 |
| 2,294,143 | 8/1942 | Watson | 29/6 |
| 2,910,328 | 10/1959 | Frölich | 415/175 |
| 4,477,223 | 10/1984 | Giroux | 415/110 |
| 5,004,407 | 4/1991 | Hutchison | 184/6.23 |

FOREIGN PATENT DOCUMENTS

| | | | |
|---|---|---|---|
| 816117 | 10/1951 | Fed. Rep. of Germany . | |
| 0191403 | 11/1982 | Japan | 415/110 |
| 0237899 | 10/1986 | Japan | 415/111 |
| 1366716 | 1/1988 | U.S.S.R. | 415/111 |
| 451093 | 7/1936 | United Kingdom . | |

Primary Examiner—James C. Yeung
Assistant Examiner—Alan B. Cariaso
Attorney, Agent, or Firm—Morgan & Finnegan

[57] ABSTRACT

A system for recovering the lubricating oil for the bearings of a centrifugal compressor with labyrinth seals, in which the discharge pipe of the chamber facing the bearing on the compressor delivery side is connected to the top or roof of an underlying sealed collection vessel, whereas the discharge pipe of the chamber facing the bearing on the compressor suction side extends within said sealed vessel to below the free surface of the oil. A modified embodiment is also provided.

3 Claims, 2 Drawing Sheets

SYSTEM FOR RECOVERING THE LUBRICATING OIL FOR THE BEARINGS OF A CENTRIFUGAL COMPRESSOR WITH LABYRINTH SEALS

This invention relates to a system for recovering the lubricating oil for the bearings of a centrifugal compressor fitted with labyrinth seals which, by eliminating any possibility of gas or oil vapour circulating from the oil vessel to the compressor with consequent entrainment of oil towards the impeller of the first stage of the centrifugal compressor, allows effective and safe use of the compressor even in a confined environment, i.e. in an environment not in communication with the atmosphere, such as the sea bed.

A centrifugal compressor with labyrinth seals is known to consist substantially of one or more impellers mounted on a shaft which rotates at high speed on bearings lubricated with oil pressurized by a pump which draws it from a collection vessel and feeds it into chambers facing said bearings, from which the oil is then discharged by gravity through pipes which return it to said vessel, said chambers being separated by labyrinth seals from the internal compressor regions occupied by the process gas.

Again in said compressors, in addition to the flow of lubricating oil passing by gravity through said discharge pipes, which are generally connected to a single header connected to said collection vessel, there is also a certain gas flow from said bearing chambers to the oil vessel.

This gas flow arises for various reasons, including the fact that because of its closeness to the higher pressure regions, the bearing chamber on the compressor delivery side is evidently at a higher pressure than the bearing chamber on the compressor suction side, which is generally at the suction pressure, with the result that a deleterious gas stream is created which could entrain oil vapour and droplets through the labyrinth seal and towards the impeller of the first compressor stage, this being currently compensated in the conventional applications of centrifugal compressors with labyrinth seals by simply connecting the lubricating oil vessel to atmosphere by a vent on the top or roof of the vessel, through which said gas is discharged to atmosphere without being able to create a gas stream.

Hence, it can be said that the state of the art enables the problem of separating the process gas from the lubricating oil to be easily solved in those cases in which the oil vessel can be connected to atmosphere.

In contrast, if the compressor is installed in a confined environment, i.e. in an environment not in communication with the atmosphere, for example the sea bed, account must be taken not only of the lack of an atmospheric environment but also of the extreme difficulty of access to the machine and its auxiliaries for maintenance purposes, it therefore being even more important that oil cannot enter the compressor, because this oil would be permanently removed from the vessel, which is of fairly limited capacity and has no facility for make-up unless costly methods are used such as the provision of a make-up line connected to land or to a platform.

In the case of a confined environment, it is also apparent that the pressure of the oil vessel must logically be assumed to be the lowest available pressure, i.e. the compressor suction pressure, with the result that said gas flow which gives rise to the deleterious circulation of oil particles and vapour is no longer compensated, leading to an intolerable loss of lubricating oil. This is the reason why current centrifugal compressors with labyrinth seals cannot be used in confined environments. The object of the present invention is to obviate the aforesaid drawback by providing a system for recovering the lubricating oil for the bearings of a centrifugal compressor with labyrinth seals which, by preventing any gas circulation through the oil discharge pipes and consequently any oil loss, enables such a compressor to be also used in confined environments.

This object is substantially achieved by using two separate pipes for the gravity discharge of lubricating oil from the chambers facing the bearings to the oil collection vessel, of which the discharge pipe relative to the higher pressure chamber, and hence relative to the bearing situated on the delivery side of the compressor, is connected to the top or roof of said vessel, whereas the other discharge pipe relative to the bearing situated on the suction side of the compressor, and hence relative to the lower pressure chamber, extends within the same vessel to below the free surface of the oil, so that in this latter pipe an oil head is created of height corresponding to the pressure difference between the two pipes.

In this respect, this nullifying of the pressure difference between the two pipes ensures that no circulation of gas or oil vapour can take place between the vessel and the compressor. Thus, the system for recovering the lubricating oil for the bearings of a centrifugal compressor with labyrinth seals, comprising a pump which draws the lubricating oil from an underlying collection vessel and feeds it under pressure into a chamber facing the bearing situated on the suction side of the compressor and into a chamber facing the bearing situated on the delivery side of the compressor, from which the oil is discharged by gravity through corresponding discharge pipes which return it to said underlying collection vessel, is characterised according to the present invention in that said collection vessel is sealed and said discharge pipes are separate from each other, the discharge pipe relative to the chamber on the delivery side of the compressor being connected to the top or roof of said underlying vessel, whereas the discharge pipe relative to the chamber on the suction side of the compressor extends within said vessel to below the free surface of the oil.

However, as the oil head to be created within said discharge pipe which dips into the oil in said collection vessel in order to compensate the pressure differences between the two discharge pipes has a height which is always of the order of 500-2000 mm of oil, it will be apparent that a sufficient space must be available below the compressor.

In those cases in which there is a lack of space or in which the vessel must remain very close to the compressor, according to a modified embodiment of the present invention said discharge pipe relative to the chamber on the suction side of the compressor is also connected to the top or roof of said underlying sealed vessel and is provided with a dynamic barrier of liquid ring type which allows the oil to pass by gravity but prevents passage of any gas or vapour in the opposite direction, said dynamic barrier consisting of a disc rotating within a toroidal stator part which with the disc forms a small passage which remains always filled with barrier oil by the centrifugal effect of the rotating disc.

The invention is further described hereinafter with reference to the accompanying drawings which show preferred embodiments thereof by way of non-limiting example in that technical or constructional modifications can be made thereto but without leaving the scope of the present invention.

Figure 1:
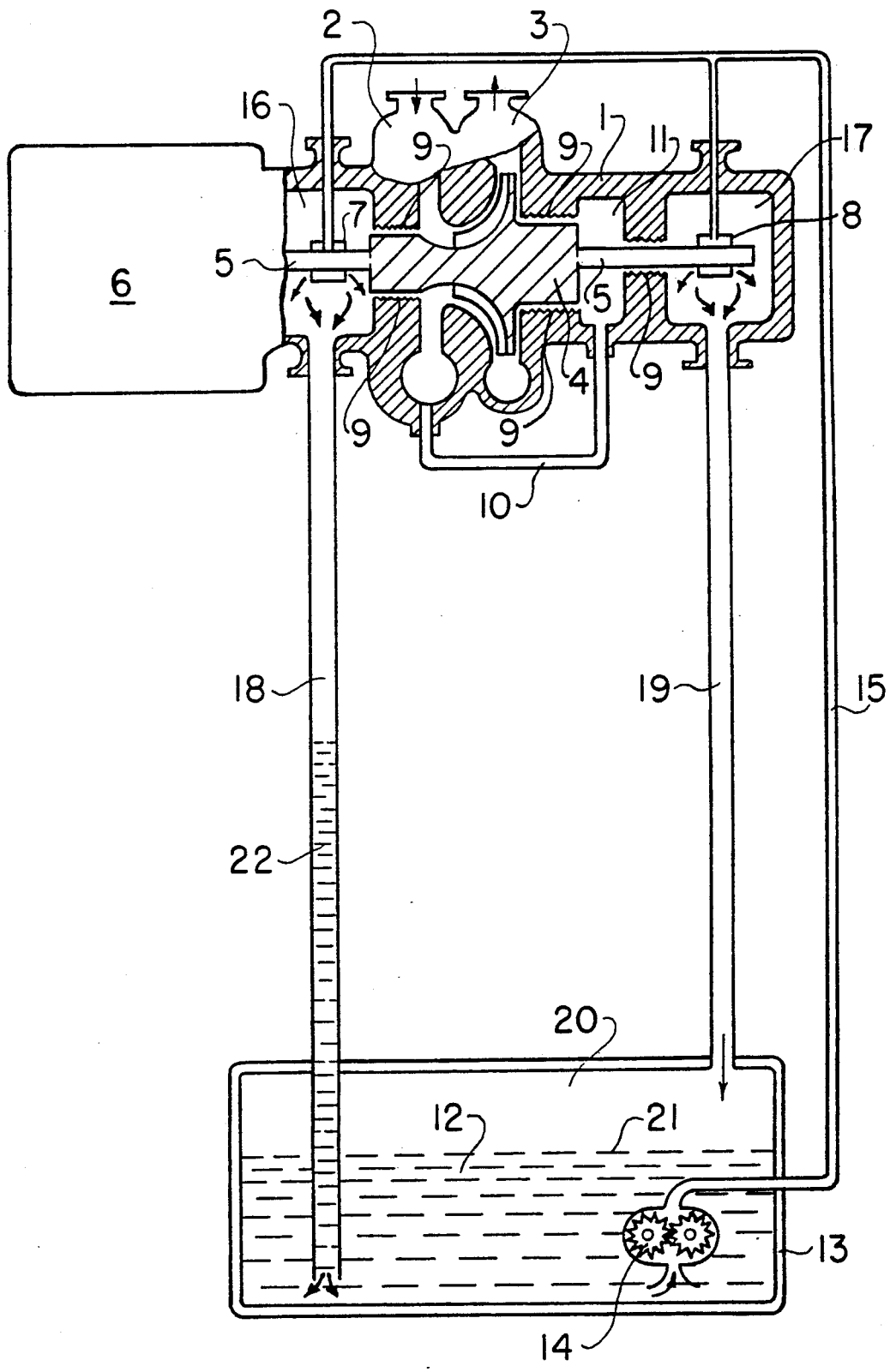
FIG. 1 is a partly sectional front view of a centrifugal compressor with labyrinth seals, using the lubricating oil recovery system of the invention.

With reference to the figures, in which corresponding elements are indicated by the same reference numeral, 1 indicates a centrifugal compressor in which the process gas, entering through the suction duct 2 and leaving through the delivery duct 3, is compressed by the blades of an impeller 4 mounted on the shaft 5, which is rotated at high speed by a motor 6 on bearings 7 and 8 located respectively on the suction side and on the delivery side of the compressor compression region, separated by labyrinth seals 9. The figures also show the duct 10 by which the compressor suction pressure is transmitted to the chamber 11 upstream of the impeller 4.

Said bearings 7 and 8 are continuously lubricated by the lubricating oil 12 contained in an underlying sealed collection vessel 13 from which it is withdrawn by a pump 14 which, via the pipe 15, feeds it respectively into a chamber 16 facing said bearing 7 and into a chamber 17 facing said bearing 8. The oil then flows out of said chambers 16 and 17 by gravity and through the separate discharge pipes 18 and 19 respectively, which return it to said collection vessel 13. For this purpose, said discharge pipe 19 is connected to the top or roof 20 of the vessel 13, whereas said discharge pipe 18 extends within said vessel 13 to below the free surface 21 of the oil 12.

In this manner, as can be clearly seen from FIG. 1, the gas or oil vapour contained in the roof 20 of the collection vessel 13 is unable to flow into the submerged pipe 18 in which an oil head 22 is created to nullify the inevitable pressure difference between the chambers 17 and 16.

Figure 2:
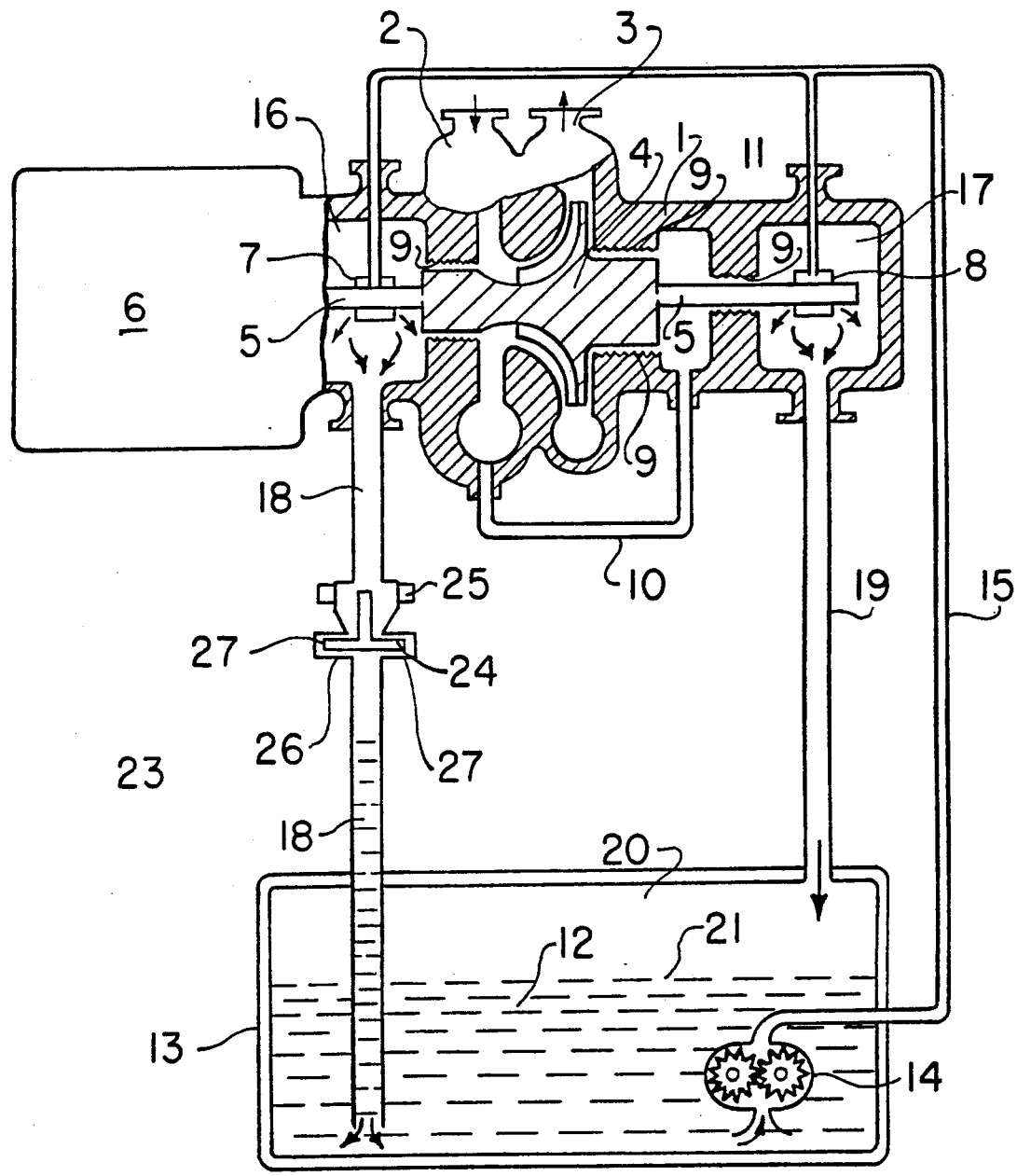
FIG. 2 is a partly sectional front view of a centrifugal compressor with labyrinth seals, using a further embodiment of the lubricating oil recovery system of the invention.

In the modified embodiment of FIG. 2, said discharge pipe 18 is also connected to the top or roof 20 of the vessel 13, as in the case of the pipe 19, and in addition is provided with a dynamic barrier of liquid ring type 23, consisting of a disc 24 rotated by a motor 25 within a toroidal stator part 26 to form with the disc 24 a small passage 27 which remains filled with the oil centrifuged by the disc 24 to prevent passage of gas and/or vapour.

I claim:

1. A system for recovering the lubricating oil for the bearings of a centrifugal compressor having a suction side chamber and a delivery side chamber with respective sets of lubricated bearings therein with labyrinth seals, comprising a pump, a sealed collection vessel for accommodating a free oil surface therein and for feeding the lubricating oil under pressure into the chamber with the bearing situated on the suction side of the compressor and into the chamber with the bearing situated on the delivery side of the compressor, at least two separate discharge pipes, one of said discharge pipes communicating with the chamber on the delivery side of the compressor and said sealed collection chamber above said free oil surface to enable gravity flow thereto of the lubricating oil from the delivery side compressor chamber, another of said discharge pipes communicating with the chamber on the suction side of the compressor and said sealed collection vessel to further establish a vapor barrier between said free oil surface and the suction side chamber that stops gas and oil vapor flow from the suction side bearing chamber to the compressor, and a duct for establishing compressor suction pressure at the delivery side of the compressor to prevent oil flow into the suction side thereof to establish a bearing lubricating oil recovery system that is independent of and without communication with the environment external to the system.

2. A system for recovering lubricating oil as claimed in claim 1, further comprising in that said discharge pipe communicating with the chamber on the suction side of the compressor also communicates with said sealed collection chamber above said free oil surface and in which said vapor barrier is a dynamic barrier of liquid ring type having a disc for rotation within a toroidal stator part with which the disc forms a small passage for filling with barrier oil by the centrifugal effect of said disc.

3. A system for recovering lubricating oil as recited in claim 1, wherein said vapor barrier between said free oil surface and the suction side chamber that stops gas and oil vapor flow from the suction side bearing chamber to the compressor further comprises said other of said discharge pipes communicating with said sealed collection vessel below said free oil surface in order to compensate the pressure difference between said discharge pipes by establishing an oil head of about 500 to 2000 mm of oil within said other discharge pipe.

* * * * *